United States Patent
Omiya (10) Patent No.: US 8,238,542 B2
(45) Date of Patent: Aug. 7, 2012

(54) OPERATING MANAGING SERVER, SYSTEM, COMPUTER-ACCESSIBLE MEDIUM AND PROGRAM

(75) Inventor: Toshiyuki Omiya, Tokyo (JP)

(73) Assignee: P&W Solutions Co., Ltd., Tokyo (JP)

( * ) Notice: Subject to any disclaimer, the term of this patent is extended or adjusted under 35 U.S.C. 154(b) by 583 days.

(21) Appl. No.: 12/446,909

(22) PCT Filed: Oct. 18, 2007

(86) PCT No.: PCT/JP2007/070369
§ 371 (c)(1),
(2), (4) Date: Oct. 13, 2009

(87) PCT Pub. No.: WO2008/050672
PCT Pub. Date: May 2, 2008

(65) Prior Publication Data
US 2011/0038474 A1    Feb. 17, 2011

(30) Foreign Application Priority Data
Oct. 23, 2006   (JP) .................................. 2006-287200

(51) Int. Cl.
H04M 3/00   (2006.01)
(52) U.S. Cl. .............................. 379/265.07; 379/265.03
(58) Field of Classification Search . 379/265.01–265.09
See application file for complete search history.

(56) References Cited

U.S. PATENT DOCUMENTS
2008/0037761 A1* 2/2008 Cordell et al. ........... 379/265.04

FOREIGN PATENT DOCUMENTS

| JP | 2000-349904 | 12/2000 |
|---|---|---|
| JP | 2001313725 | 11/2001 |
| JP | 2001326736 | 11/2001 |
| JP | 2002-232566 | 8/2002 |
| JP | 2003-198736 | 7/2003 |
| JP | 2003-309656 | 10/2003 |
| JP | 2006-094260 | 4/2006 |

OTHER PUBLICATIONS

English language International Search Report for International Application No. PCT/JP2007/070369 filed Oct. 18, 2007.
CTstage®4i Call Center Manager's Guide—UnPBX Model—A1 Edition, Oki Electric Industry Co., Ltd., Sep. 29, 2006, A1 Edition, Sep. 19, 2003, p. 118, 120, 121, 123, 136-138.

* cited by examiner

Primary Examiner — Creighton Smith
(74) Attorney, Agent, or Firm — Dorsey & Whitney LLP (57) ABSTRACT

According to exemplary embodiments of the present disclosure, a monitoring device can be provided that facilitates a supervisor in a contact center to recognize the status of each operator easily, and to recognize an irregularity in operation quickly. For example, a server can be connected to a telephone switchboard and a terminal which can include a display unit that, via a communication line; can receive operational status data indicating an operating status of a telephone from the telephone switchboard, measure an elapsed time after a change in the operational status, read out the configuration data associated and stored beforehand according to the received operational status data, generate display data for displaying an image indicating the operational status and the elapsed time, at a prescribed position on the display unit corresponding to a seating position of the operator, based on the configuration data and the elapsed time, and transmit the data to the terminal.

19 Claims, 4 Drawing Sheets

CONFIGURATION TABLE

| DIVISION | STATUS | DISPLAY | COLOR | THRESHOLD VALUE |
|---|---|---|---|---|
| 001 | NotReady | YES | BLUE | 5MIN |
| 001 | Ready | YES | RED | 20MIN |
| 001 | Talking | YES | GREEN | 10MIN |
| 001 | Reserved | YES | YELLOW | 30MIN |
| ... | ... | ... | ... | ... |

FIG. 6

STATUS TABLE

| OPERATOR ID | EXTENSION NUMBER | STATUS | STARTING TIME |
|---|---|---|---|
| 001 | 1001 | Talking | 14:20:35 |
| ... | ... | ... | ... |

FIG. 7

SEAT CATEGORIZATION TABLE

| EXTENSION NUMBER | CAMPAIGN | SEAT POSITION |
|---|---|---|
| 1001 | A | (100,50) |
| ... | ... | ... |

OPERATING MANAGING SERVER, SYSTEM, COMPUTER-ACCESSIBLE MEDIUM AND PROGRAM

CROSS-REFERENCE TO RELATED APPLICATION(S)

This application is a national stage application of PCT Application No. PCT/JP2007/070369 which was filed on Oct. 18, 2007 and published on May 2, 2008 as International Publication No. WO 2008/050672 (the "International Application"). This application claims priority from the International Application pursuant to 35 U.S.C. §365, and from Japanese Patent Application No. 2006-287200 filed on Oct. 23, 2006 under 35 U.S.C. §119. The disclosures of the above-referenced applications are incorporated herein by reference in their entities.

FIELD OF THE DISCLOSURE

The present invention relates to a server, system, and program supervising a state of operators in a contact center.

BACKGROUND INFORMATION

Conventionally, a supervisor (e.g., a manager) monitors an operational state of a plurality of operators in a contact center (e.g., a call center). The supervisor generally gives support or instructions on the spot, or takes over in handling, by information and the like from operators in a case of discovering such irregularities as long durations of calls, processing time, and the like. As a result, the role of the supervisor in maintaining or improving the level of service in calls, or in improving operational efficiency, is large; in particular, speed in discovery of irregularities is likely sought.

In such situation, for example, as described in Japanese Unexamined Patent Application Publication No. 2003-309656, in order quickly to recognize a shortage of operators, a device to list the operational status of telephone terminals and durations of calls has been proposed.

SUMMARY OF EXEMPLARY EMBODIMENTS OF THE DISCLOSURE

However, even with the device described in Japanese Unexamined Patent Application Publication No. 2003-309656, a supervisor can (at best) recognize an insufficiency in operators from connection rate or call duration, but learning in a timely manner the state of each operator, including seating position, elapsed time, and the like, when in states other than during the call can be difficult. As a result, it is still difficult for the supervisor to notice irregularities quickly in during the operation or work of each operator.

Therefore, one of the objects of the exemplary embodiments of the present disclosure is to provide a monitoring device facilitating a supervisor to recognize (i) the state of each operator easily, and (ii) an irregularity in operation quickly.

Accordingly, to achieve at least some of some objectives, a first exemplary embodiment of the present disclosure can be provided, in which a server can be connected via a communication line to a telephone switchboard and a terminal which can includes a display unit, and can monitor a state of an operator in a contact center. The exemplary server can include a first part/arrangement configured to receive operational status data indicating an operational status of a telephone terminal used by the operator from the telephone switchboard. The exemplary server can also include a second part/arrangement configured to measure an elapsed time after a change of the operational status, and a third part/arrangement configured to read out configuration data associated and stored beforehand according to the received operational status data. In addition, the exemplary server can include a fourth part/arrangement configured to (i) generate display data for displaying an image indicating the operational status and the elapsed time at a predetermined position on the display unit corresponding to a seating position of the operator, and (ii) send the display data to the terminal, based on the configuration data and the elapsed time.

According to such exemplary configuration, the server can be connected via a communication line to a telephone switchboard and a terminal which includes a display unit. Such exemplary server can receive operational status data indicating an operational status of a telephone terminal used by the operator in a contact center from the telephone switchboard, measure an elapsed time after a change of the operational status, read out configuration data associated and stored beforehand according to the received operational status data, generate display data for displaying an image indicating the operational status and the elapsed time at a predetermined position on the display unit corresponding to a seating position of the operator, based on the configuration data and the elapsed time, and send the display data to the terminal.

In this exemplary manner, since the supervisor can confirm a position of the operator and elapsed time for each process on a screen of the terminal, there is a possibility of quickly discovering the particular operator for whom a problem has occurred. As a result, since a response to the problem likely becomes quicker, there is a possibility and/or likelihood of an increased processing efficiency in the contact center.

According to a second exemplary embodiment of the present disclosure, the server according to the first exemplary embodiment can further include a fifth part/arrangement configured to associate display color data of the image with the operational status data and storing thereof, as one portion of the configuration data. For example, the image can be color-coded by the display color data according to the operational status. According to such exemplary configuration, the server can be configured to associate display color data of the image with the operational status data and stores thereof, as one portion of the configuration data, and the image is color-coded by the display color data according to the operational status. In this exemplary manner, since the server can display the statuses of work of operators by color-coding, there is a possibility and/or likelihood that a supervisor can visually recognize these readily.

In a third exemplary embodiment of the present disclosure, the exemplary server according to the second exemplary embodiment can further include a sixth part/arrangement configured to receive the display color data from the terminal. According to such exemplary configuration, the exemplary server can be configured to receive the display color data from the terminal and reflects thereof by color-coding of the image. In this exemplary manner, the supervisor can configure his or her own easily viewable distribution of colors from the terminal, and color-code and display operator status; therefore, there is a possibility and/or likelihood of simplifying status recognition of work of an operator.

In a fourth exemplary embodiment of the present disclosure, the exemplary server according to any of the first to third exemplary embodiments can further include a seventh part/arrangement configured to associate a threshold value for the elapsed time with the operational status data and storing thereof, as one portion of the configuration data. For example, in a case where the elapsed time exceeds the threshold value, an exemplary display aspect of the elapsed time in the image can be changed. According to such exemplary configuration, the exemplary server can associate a threshold value for the elapsed time with the operational status data and stores thereof, as one portion of the configuration data, and in a case where the elapsed time exceeds the threshold value, a display aspect of the elapsed time in the image can be changed. In this exemplary manner, a user (e.g., the supervisor) of the terminal can easily recognize a continued state that exceeds a threshold value by, for example, a change of display color and the like, and therefore can quickly discover the occurrence of a problem.

In a fifth exemplary embodiment of the present disclosure, the exemplary server according to the fourth exemplary embodiment can further include an eighth part/arrangement configured to receive the threshold value from the terminal. According to such exemplary configuration, the exemplary server can receive the threshold value from the terminal, and based on the received threshold value, can change a display aspect of the elapsed time in the image. In this exemplary manner, the supervisor can freely input and configure a threshold value based on experience, past statistical data, or the like from the terminal, and therefore it is possible to reconfigure thereof flexibly according to task contents of the contact center.

According to a sixth exemplary embodiment of the present disclosure, in the exemplary server according to any of the first to fifth exemplary embodiments, the display data can include data identifying the operator and an extension number. According to such exemplary configuration, it is possible for the supervisor to know an extension number of a problematic operator immediately. As a result, since it becomes possible to respond quickly, there is a possibility and/or likelihood of increasing the processing efficiency of the contact center.

For example, a plurality of people can have the role of the operator for the telephone terminal. In such exemplary case, it is possible to include data identifying a plurality of operators, or data indentifying one representative operator, in the display data.

In a seventh exemplary embodiment of the present disclosure, the exemplary server according to any of the first to sixth exemplary embodiments can further include a ninth part/arrangement configured to receive identification data of a recording device recording a conversation of the operator from the telephone switchboard. For example, the display data can include the received identification data. According to such exemplary configuration, the exemplary server can receive identification data of a recording device recording a conversation of the operator from the telephone switchboard, and the display data can include the received identification data. In this exemplary manner, it is possible for the supervisor to know identification data of a call log of a problematic operator immediately. As a result, since it is possible to refer quickly to contents of a conversation in responding to a problem, there is a possibility and/or likelihood of increasing the processing efficiency of a contact center.

In an eighth exemplary embodiment of the present disclosure, the exemplary server according to any of the first to seventh exemplary embodiments can further include:

a tenth part/arrangement configured to associate categorization data that is categorized into each task for which the telephone terminal is used and categorization color data for distinguishing the display thereof, with data identifying the telephone terminal beforehand, and storing thereof;

an eleventh part/arrangement configured to receive a response rate for each of the tasks evaluated by the telephone switchboard, and a twelfth part/arrangement configured to send the response rate for each of the tasks received to the terminal in order to be displayed on the display unit, in which the display data can include the categorization color data.

According to such exemplary configuration, the exemplary server can associate categorization data that is categorized into each task for which the telephone terminal is used and categorization color data for distinguishing the display thereof, with data identifying the telephone terminal beforehand, and store thereof; receive a response rate for each of the tasks evaluated by the telephone switchboard; and display the response rate for each of the received tasks; furthermore, the display data can include the categorization color data.

In this exemplary manner, it is possible for the exemplary server to color-code and display a plurality of telephone terminals for each task, and additionally to display a response rate of each task. As a result, it is possible for the supervisor to know whether the situation can currently be responded to, for each task, by a response rate, and there is a possibility and/or likelihood, for example, of efficiently responding by increasing operators for a task such as for which a response rate is decreasing (e.g., a service level is becoming lower).

In a ninth exemplary embodiment of the present disclosure, the exemplary server according to the eighth exemplary embodiment can further include a thirteenth part/arrangement configured to obtain a standby level for the operator for each of the tasks, based on the operational status, and a fourteenth part/arrangement configured to send to the terminal an image indicating the standby level in order to display thereof to be linked to the response rate.

According to such exemplary configuration, the server can obtain a standby level for the operator for each of the tasks, based on the operational status, and display an image indicating the standby level to be linked to the response rate.

In this exemplary manner, it is possible for the exemplary server to obtain and to display a standby level for the operator. As a result, since it is possible for the supervisor to recognize easily whether there is latitude in a number of required personnel for the task, there is a possibility and/or likelihood of effectively handling the repositioning of an operator.

Moreover, an image indicating a standby level for an operator may be an index number, and may also be a color-coded lamp-shaped image or the like.

In a tenth exemplary embodiment of the present disclosure, a system that monitors a state of an operator in a contact center can be provided. The system can include at least a server and a terminal connected via a communication line. The exemplary server can include:

a first part/arrangement configured to receive operational status data indicating an operational status of a telephone terminal used by the operator from a telephone switchboard connected to the server;

a second part/arrangement configured to measure an elapsed time after a change in the operational status;

a third part/arrangement configured to read out configuration data associated and stored beforehand according to the received operational status data; and a fourth part/arrangement configured to generate display data for displaying an image indicating the operational status and the elapsed time, based on the configuration data and the elapsed time. For example, the terminal can includes a particular part/arrangement configured to display the image at a predetermined position on a display unit of the terminal corresponding to a seating position of the operator, based on the display data received from the server.

According to such exemplary configuration, by operating the exemplary system, it is possible to anticipate the same kind of effect as in the first exemplary embodiment.

According to an eleventh exemplary embodiment of the present disclosure, in the exemplary system according to the tenth exemplary embodiment, the exemplary server can further include a fifth part/arrangement configured to associate display color data of the image with the operational status data and store thereof, as one portion of the configuration data. For example, the image can be color-coded by the display color data according to the operational status. According to such exemplary configuration, by operating the exemplary system, it is possible to anticipate the same kind of effect as in the second exemplary embodiment.

According to a twelfth exemplary embodiment of the present disclosure, in the exemplary system according to the eleventh exemplary embodiment, the exemplary terminal can further includes a part/arrangement configured to accept an input of the display color data from a user and sending thereof to the server. According to such exemplary configuration, by operating the exemplary system, it is possible to anticipate the same kind of effect as in the third exemplary embodiment.

According to a thirteenth exemplary embodiment of the present disclosure, in the exemplary system according to any of the tenth to twelfth exemplary embodiments, the exemplary server can further include a sixth part/arrangement configured to associate a threshold value for the elapsed time with the operational status data and store thereof as one portion of the configuration data. For example, in a case where the elapsed time exceeds the threshold value, a display aspect of the elapsed time in the image can be changed. According to such exemplary configuration, by operating the exemplary system, it is possible to anticipate the same kind of effect as in the fourth exemplary embodiment.

According to a fourteenth exemplary embodiment of the present disclosure, in the exemplary system according to the thirteenth exemplary embodiment, the exemplary terminal can further include an additional part/arrangement configured to accept at least one input of the threshold value from the user and send such one or more inputs to the exemplary server. According to such exemplary configuration, by operating the exemplary system, it is possible to anticipate the same kind of effect as in the fifth exemplary embodiment.

In a fifteenth exemplary embodiment of the present disclosure, in the exemplary system according to any of the tenth to fourteenth exemplary embodiments, the display data can include data identifying the operator and an extension number. According to such exemplary configuration, by operating the system, it is possible to anticipate the same kind of effect as in the sixth exemplary embodiment.

According to a sixteenth exemplary embodiment of the present disclosure, in the exemplary system according to any of the tenth to fifteenth exemplary embodiments, the exemplary server can further include a seventh part/arrangement configured to receive identification data of a recording device recording a conversation of the operator from the telephone switchboard. For example, the display data can include the received identification data. According to such exemplary configuration, by operating the system, it is possible to anticipate the same kind of effect as in the seventh exemplary embodiment.

According to a seventeenth exemplary embodiment of the present disclosure, in the exemplary system according to any one of the tenth to sixteenth exemplary embodiments, the exemplary server can further include (i) an eighth part/arrangement configured to associate categorization data that is categorized into each task for which the telephone terminal is used, and categorization color data for distinguishing the displaying thereof, with data identifying the telephone terminal beforehand, and store thereof, and (ii) a ninth part/arrangement configured to receive a response rate for each of the tasks evaluated by the telephone switchboard. Further, the exemplary terminal further can includes a part/arrangement configured to display the response rate for each of the tasks received from the server on the display unit. The display data can include the categorization color data.

According to such exemplary configuration, by operating the exemplary system, it is possible to anticipate the same kind of effect as in the eighth exemplary embodiment.

According to an eighteenth exemplary embodiment of the present disclosure, in the exemplary system according to the seventeenth exemplary embodiment, the exemplary server can further include a tenth part/arrangement configured to obtain a standby level for the operator for each of the tasks, based on the operational status. The exemplary terminal can further include a part/arrangement configured to link an image indicating the standby level received from the server to the response rate, and display thereof. According to such exemplary configuration, by operating the exemplary system, it is possible to anticipate the same kind of effect as in the ninth exemplary embodiment.

In a nineteenth exemplary embodiment of the present disclosure, a computer program for monitoring a state of an operator in a contact center can be provided in a system. For example, such program can be stored and/or provided on a computer-accessible medium (e.g., at least one computer storage device). The exemplary system can include a server and a terminal connected via a communication line. The computer program can configure the server to execute procedures comprising:

receiving operational status data indicating an operational status of a telephone terminal used by the operator, from the telephone switchboard, measuring an elapsed time after a change of the operational status, reading out configuration data associated and stored beforehand according to the received operational status data, and generating display data for displaying an image indicating the operational status and the elapsed time, based on the configuration data and the elapsed time; and causing the terminal to execute a step of displaying the image at a predetermined position on a display unit of the terminal corresponding to a seating position of the operator, based on the display data received from the server.

According to such exemplary configuration, by the exemplary system executing such procedure(s), it is possible to anticipate the same kind of effect as in the first exemplary embodiment.

In a twentieth exemplary embodiment of the present disclosure, the exemplary program according to the nineteenth exemplary embodiments can further configure the exemplary server to associate display color data of the image with the operational status data and store thereof, as one portion of the configuration data. For example, the image can be color-coded by the display color data according to the operational status. According to such exemplary configuration, by configuring the exemplary system to execute such procedure(s), it is possible to anticipate the same kind of effect as in the second exemplary embodiment.

In a twenty-first exemplary embodiment of the present disclosure, the exemplary program according to the twentieth exemplary embodiments can further configure the exemplary terminal to accept an input of the display color data from a user, and send thereof to the server. According to such exemplary configuration, by configuring the exemplary system to execute such procedure(s), it is possible to anticipate the same kind of effect as in the third exemplary embodiment.

In a twenty-second exemplary embodiment of the present disclosure, the exemplary program according to any of the nineteenth to twenty-first exemplary embodiments can further configure the exemplary server to associate a threshold value for the elapsed time with the operational status data, and store thereof, as one portion of the configuration data. For example, in a case where the elapsed time exceeds the threshold value, a display aspect of the elapsed time in the image can be changed. According to such exemplary configuration, by configuring the exemplary system to execute such procedure(s), it is possible to anticipate the same kind of effect as in the fourth exemplary embodiment.

In a twenty-third exemplary embodiment of the present disclosure, the exemplary program according to the twenty-second exemplary embodiment can further configure the terminal to accept input of the threshold value from a user, and send thereof to the exemplary server. According to such exemplary configuration, by configuring the exemplary system to execute such procedure(s), it is possible to anticipate the same kind of effect as in the fifth exemplary embodiment.

In a twenty-fourth exemplary embodiment of the present disclosure, in the exemplary program according to any of the nineteenth to twenty-third exemplary embodiments, the display data can include data identifying the operator and an extension number. According to such exemplary configuration, by configuring the exemplary system to execute such procedure(s), it is possible to anticipate the same kind of effect as in the sixth exemplary embodiment.

In a twenty-fifth exemplary embodiment of the present disclosure, the exemplary program according to any of the nineteenth to twenty-fourth exemplary embodiments can further configure the exemplary server to receive identification data of a recording device recording a conversation of the operator, from the telephone switchboard, in which the display data can include the received identification data. According to such exemplary configuration, by configuring the exemplary system to execute such procedure(s), it is possible to anticipate the same kind of effect as in the seventh exemplary embodiment.

In a twenty-sixth exemplary embodiment of the present disclosure, the exemplary program according to any of the nineteenth to twenty-fifth exemplary embodiments can further configure the exemplary server to (i) associate categorization data that is categorized into each task for which the telephone terminal is used and categorization color data for distinguishing the displaying thereof, with data identifying the telephone terminal beforehand, and store thereof; and (ii) receive a response rate for each of the tasks evaluated by the telephone switchboard; and configure the exemplary terminal to display the response rate for each of the tasks received from the server, on the display unit, in which the display data can include the categorization color data. According to such exemplary configuration, by configuring the exemplary system to execute such procedure(s), it is possible to anticipate the same kind of effect as in the eighth exemplary embodiment.

In a twenty-seventh exemplary embodiment of the present disclosure, the exemplary program according to the twenty-sixth exemplary embodiment can further configure the exemplary server to obtain a standby level for the operator for each of the tasks, based on the operational status, and can configure the exemplary terminal to (i) link an image indicating the standby level received from the server to the response rate, and (ii) display thereof. According to such exemplary configuration, by configuring the exemplary system to execute such procedure(s), it is possible to anticipate the same kind of effect as in the ninth exemplary embodiment.

Further, according to the exemplary embodiment of the present disclosure, it is possible to provide a monitoring device for which, in a call center, it is possible for a supervisor to recognize a state of each operator easily, and to recognize an irregularity in operation quickly.

These and other objects, features and advantages of the present disclosure will become apparent upon reading the following detailed description of exemplary embodiments of the present disclosure, when taken in conjunction with the appended claims.

BRIEF DESCRIPTION OF THE DRAWINGS

Further exemplary objects, features and advantages of the invention will become apparent from the following detailed description taken in conjunction with the accompanying figure showing illustrative embodiment(s), result(s) and/or feature(s) of the exemplary embodiment(s) of the present disclosure, in which.

While the certain exemplary embodiments of the present disclosure will now be described in detail with reference to the figures, it is done so in connection with the illustrative embodiments.

DETAILED DESCRIPTION OF EXEMPLARY EMBODIMENTS

Exemplary Embodiment of System

Figure 1:
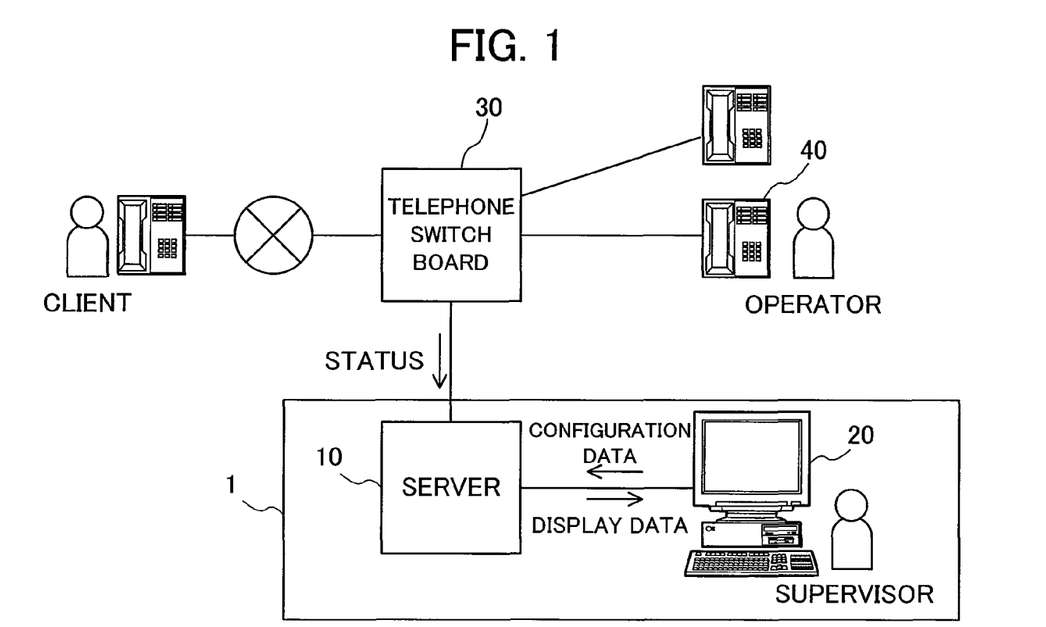
FIG. 1 is a diagram of a system according to an exemplary embodiment of the present disclosure.

FIG. 1 shows an exemplary diagram of a system 1 according to an exemplary embodiment of the present disclosure. As shown in FIG. 1, a telephone switchboard 30 monitors a state of each of telephones 40 used by a plurality of operators in a contact center, and can determine such statuses as, for example, busy with a client, on hold, and waiting for a call in relation to each of the operators.

The exemplary system 1 can include a server 10 which can receive a status of the operator determined by the telephone switchboard 30, and can measure an elapsed time of the status. Furthermore, the exemplary server 10 can generate display data, based on configuration data received from the terminal 20 which the supervisor uses, and send such display data to a terminal 20 of the exemplary system.

For example, the display data generated at the server 10 can include data corresponding to a status of an operator and an elapsed time since entering that status. Therefore, it is possible for the supervisor to visually recognize, from the screen displayed at the terminal 20, a status and elapsed time of the operator, and to determine when such an irregularity as the duration of the call being too long has occurred in a status of an operator. As a result, it is possible for the supervisor to assign assistance to an operator for which an irregularity has occurred and/or to re-staff in response thereto at an early stage.

Moreover, according to this exemplary embodiment, the server 10 and the terminal 20 can be separate devices. However, it should be understood that the exemplary configuration is not limited in any such manner, and the server 10 and the terminal 20 can be configured as a single device which can include both functions.

Exemplary Configuration of System

Figure 2:
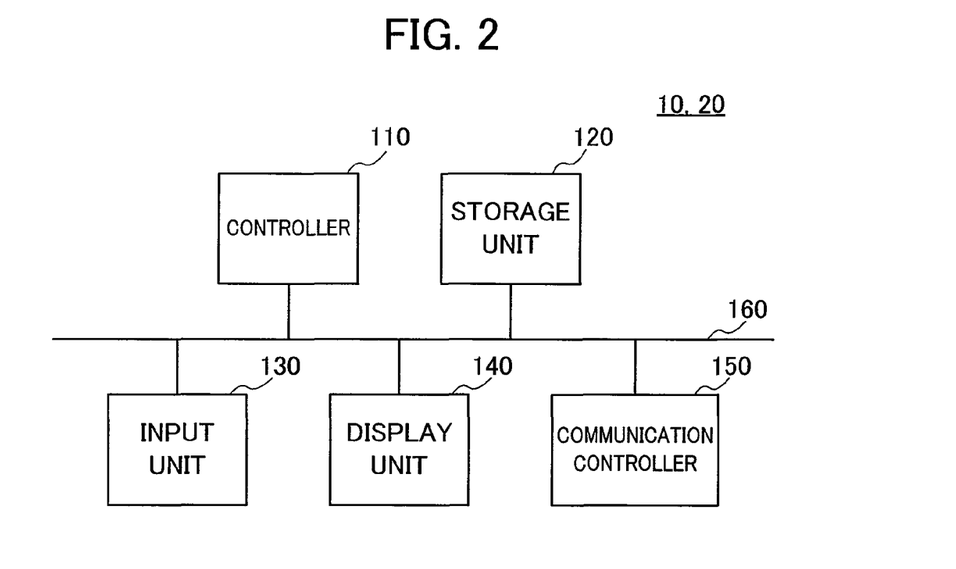
FIG. 2 is a block diagram of an exemplary configuration of a computer of the system according to a exemplary embodiment of the present disclosure.

FIG. 2 shows a block diagram of an exemplary configuration of a computer (e.g., the server 10 and the terminal 20) which is provided in the system 1 of a the exemplary embodiment of the present disclosure. For example, the server 10 and/or the terminal 20 can include a controller 110, a storage unit/arrangement 120, an input unit/arrangement 130, a display unit/arrangement 140, and a communication controller/arrangement 150 which are connected together via a bus 160.

The controller 110 can be an information central processing unit (CPU) that performs computation and processing of information, and performs control of the computer overall. The controller 110, by suitably reading out and executing various programs stored in the storage unit 120, can coordinate with the above-described hardware, and achieve various functions relating to the exemplary embodiments of the present disclosure.

The storage unit/arrangement 120 can include local memory for execution of programs in combination with the controller 110, large-capacity bulk memory, and/or cache memory to be used for efficiently performing searches of the bulk memory. As computer-readable media for realizing the storage unit 120, that which is realized electrically, magnetically, optically, or electromagnetically can be included. For exemplary, semiconductor storage devices, magnetic tapes, random access memory (RAM), read-only memory (ROM), and optical discs, including CD-ROMs, CD-R/Ws, and DVDs can be included.

The input unit/arrangement 130 can perform the acceptance of input by a user, and can include a keyboard, a pointing device, and the like. The input unit/arrangement 130 can be connected to the computer directly and/or via an intermediate I/O controller.

The display unit/arrangement 140 can be a device configured to display a screen to a user for accepting input of data, or configured to display calculation processing results of the computer on a screen, and can include display devices such as a cathode-ray tube (CRT), a liquid-crystal display (LCD), etc. The display unit/arrangement 140 can be connected to the computer directly and/or via an intermediate I/O controller.

A communication controller/arrangement 150 can be a network adapter for facilitating the computer to connect via a dedicated network or public network to another calculation processing system or storage device. The communication controller/arrangement 150 can include a modem, a cable modem, and an Ethernet (registered trademark) adapter.

Display Exemplary Embodiment

Figure 3:
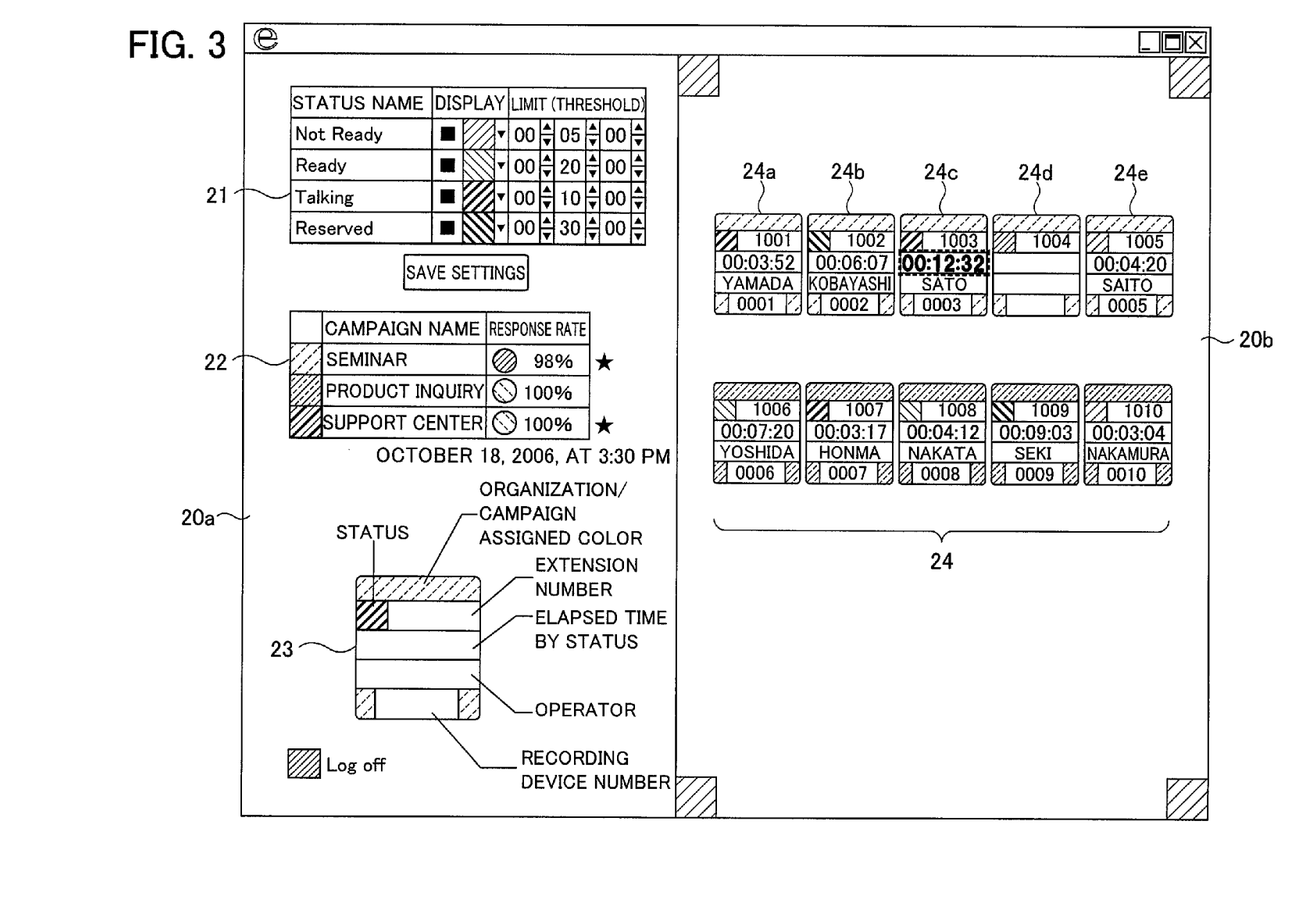
FIG. 3 is a diagram of an exemplary screen display example in a terminal according to an exemplary embodiment of the present disclosure.

FIG. 3 shows an exemplary screen display provided on the terminal 20 according to an exemplary embodiment of the present disclosure. For example, the screen can be divided into a configuration portion 20a and a seating layout portion 20b. In accordance with the content of an input accepted at the configuration portion 20a, a status and the like of each operator can be displayed in the seating layout portion 20b.

At the configuration portion 20a, e.g., in the configuration input portion 21, a selection input of a display color of each status and an input of a limit (e.g., threshold value) of an elapsed time can be accepted from the user (e.g., the supervisor). A display color can be selected from a prescribed number of colors. Moreover, for the types of display colors, it is possible to provide only enough to distinguish all statuses that can be determined. Alternatively, it is possible for a plurality of statuses to be of an identical color by reducing the types thereof. Furthermore, it is also possible to check the checkboxes for the statuses for which a determination is necessary and/or preferable, and to perform display only, e.g., in relation to the statuses.

Using these exemplary settings, it is possible for the supervisor to select a status on which to focus suitably and/or to decide upon a display color. Thus, it is, therefore, possible to recognize a required status effectively. For example, in relation to the selected display color, in order to have the supervisor confirm an input, it is possible to reflect thereof onto a seating display example 23.

An exemplary limit (e.g., a threshold value) of elapsed time is a time setting for when the same status has been continuing for a long time until a warning is issued. In relation to a status for which a threshold value is configured, in a case in which elapsed time has exceeded the threshold value, a display of the elapsed time can be changed. For example, it is possible to change from black characters to red characters, increase a size of characters, and/or flash characters, and a change that can be easily visually identifiable can be desirable.

A status and the like for each operator can be displayed in accordance with a position of a seat in the seating layout portion 20b, based on display data received from the server 10. In the display example, for example, seat images 24a and 24c can be regarding a status "talking," a seat image 24b can be regarding a status "reserved," and a seat image 24e can be regarding a status "not ready." Seat image 24d is a logged off state, and therefore is distinguished by a color with more contrast than the display colors representing status.

The seat images 24a and 24c can be regarding the same status of "talking," but the character styles of elapsed time thereof can be different. For example, a threshold value of "talking" configured in the configuration input portion 21 is 10 minutes, and therefore the elapsed time of a seat image 24c has exceeded this limit, and a display style thereof has been changed. As a result, it is possible for the supervisor to spot the seat image 24c for which an irregularity can be recognized, based on the threshold value set thereby.

Further, in the exemplary seat image 24, an extension number ("1003" in the case of the seat image 24c), a name of an operator ("Sato" in the case of the seat image 24c), and an identification number of a recording device ("0003" in the case of the seat image 24c) are displayed. As a result, it is possible for the supervisor, in the case of the seat image 24c for example, to dial the extension "1003," or, by selecting the recording device "0003," to play back the stored conversation contents or the like. For example, a response rate display portion 22 can additionally be present in the configuration portion 20a. For a plurality of campaigns (e.g., tasks, organizations, etc.), assigned colors and response rates corresponding to each can be displayed. For example, the assigned color can be configured beforehand, and can be set to accept an input from a user on a separate screen. As a result, the exemplary seat image 24 can be displayed as color-coded for each configured campaign in the seating layout portion 20b.

The exemplary response rate displayed in the response rate display portion 22 can be evaluated by the telephone switchboard 30, and transmitted to the server 10. As a result of this exemplary display, it is possible for the supervisor to easily recognize whether or not a response rate per campaign has reached a target service level. For example, in a case in which a response rate of 100% has been set as the target value, it can be determined that there is no latitude in a campaign for which the response rate is 98%.

According to one example, in a display of a response rate, additionally, it is possible to display a lamp image and the like color-coded according to the rate, and as a result, for example, if there is a red lamp, therefore a response rate is less than, e.g., 80%, and the like. Therefore, it is possible for the supervisor to easily identify visually a level of the response rate. For example, it is possible to achieve such exemplary results, for example, by previously storing data corresponding to a scope of the response rate and a color of the lamp image.

Moreover, this exemplary correspondence can be configured according to an acceptance of input from the user (e.g., the supervisor). The terminal 20 can accept a scope input of the response rate and a corresponding color selection of the lamp image by the configuration screen (not shown), and the server 10 can receive and store such data.

In this exemplary manner, while there can be campaigns for which the response rate is less than 100%, there can also exist campaigns for which the response rate is 100%, and for which there can be many operators in a standby state. Since it is possible for the supervisor to recognize this easily on the screen, it is possible to provide instructions to switch the campaign for which the operator in a standby state is in charge. As a result, even if there is a limited number of operators, it is possible to place operators without redundancy, and aim for an improvement in the response rate.

Further, even in a case in which a response rate is 100% and has achieved a target, it can be considered that there are cases in which there is latitude (e.g., cases in which there are sufficiently many operators in a standby state), and in which there is no latitude (e.g., cases in which there are almost no operators in a standby state). In an exemplary case in which there is no latitude, due to increases in the quantity of calls or increases in the like in response time, there can be a high possibility of a decrease in the response rate. Therefore, a knowledge of the latitude level (e.g., a standby level) can be useful.

Therefore, the server 10 can determine when the latitude level is low (the standby level is low), showing an indication (e.g., an asterisk) thereof. Moreover, the exemplary display method is not limited to the above, and can be any of a variety of informing aspects. It may be acceptable to display an indicator showing a latitude level (for example, a ratio of operators in a "ready" state).

Exemplary Flow of Process

Figure 4:
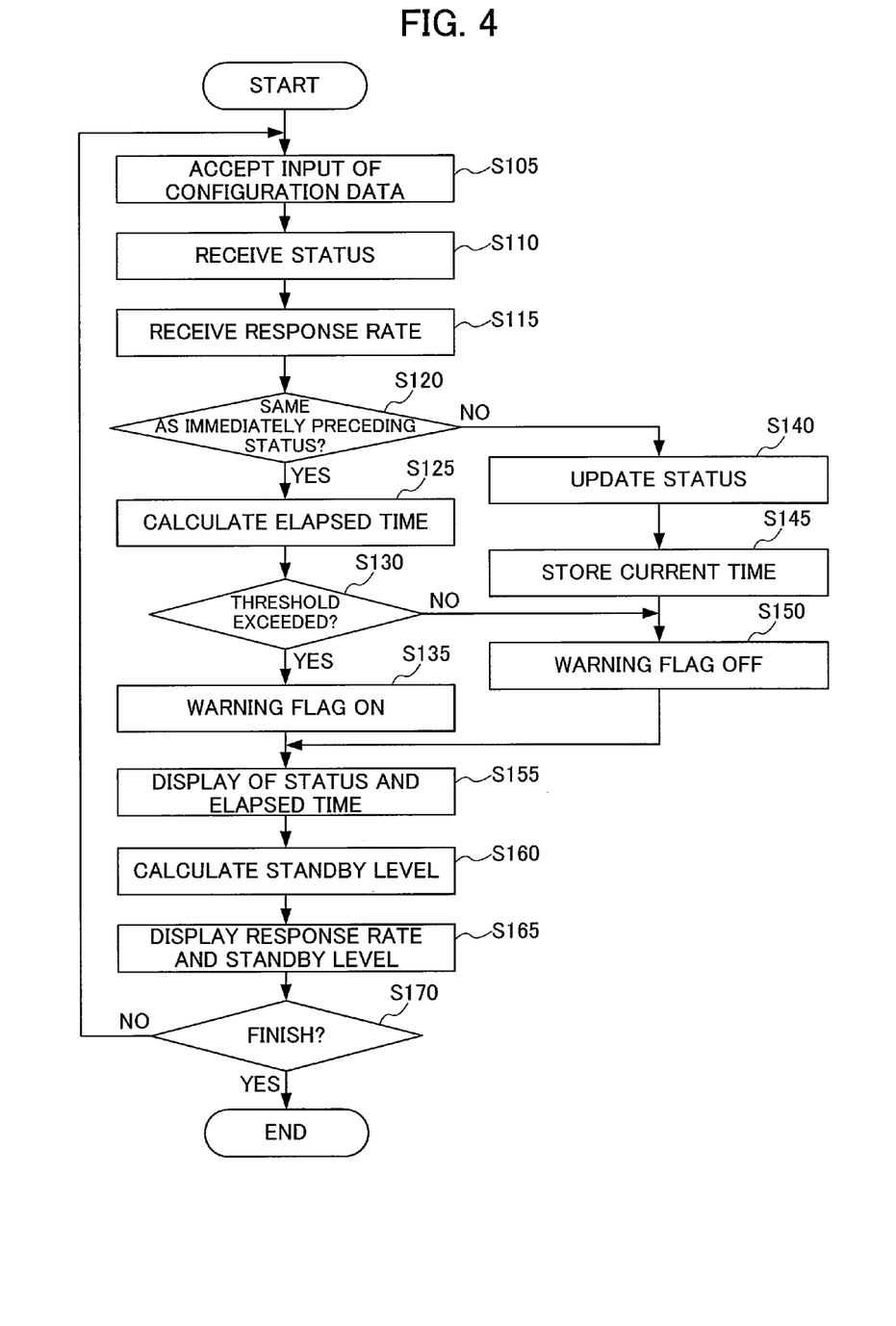
FIG. 4 is a flow diagram showing an exemplary processing flow of the system according to the exemplary embodiment of the present disclosure.

FIG. 4 shows a processing flow diagram of an exemplary process effectuated by the system 1 according to an exemplary embodiment of the present disclosure. For example, in Step S105, the terminal 20 can accept an input of configuration data (e.g., display color for each status and a threshold value of elapsed time) from the user (e.g., the supervisor), and transmit such configuration data to the server 10. The server 10 can store the received configuration data in the storage unit 120 as, for example, the exemplary configuration table shown in FIG. 5.

Figure 5:
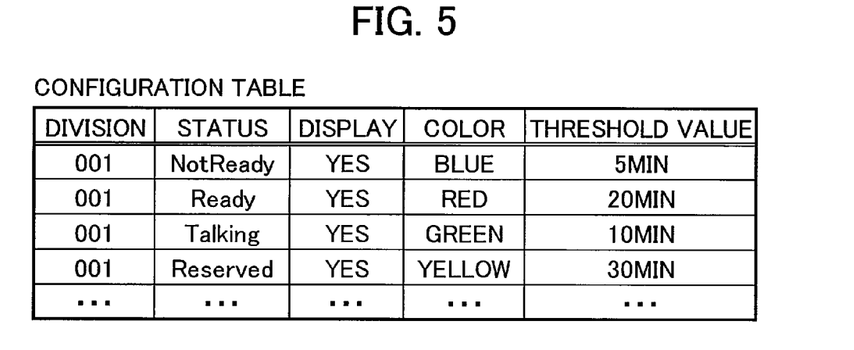
FIG. 5 is an illustration of a configuration table according to an exemplary embodiment of the present disclosure.

In the configuration table, presence or absence of an indication, display color, and a threshold value of elapsed time can be stored, for each of a division of task (campaign) contents and the like and a status. For example, in a case of a different noteworthy status or a different threshold value by task contents and the like being provided, it is possible to store such data as of display colors or threshold values corresponding to a plurality of divisions. By accepting a selection input of division from the user (e.g., the supervisor) at a process starting time, data corresponding to the selected division can be read out, thereby facilitating a change of the exemplary configuration without performing inputs individually.

In Step S110, the server 10 can receive a status (e.g., an operational status of a telephone 40) of an operator from the telephone switchboard 30. The server 10 can store the received status in the storage unit 120 as, for example, the exemplary status table shown in FIG. 6.

Figure 6:
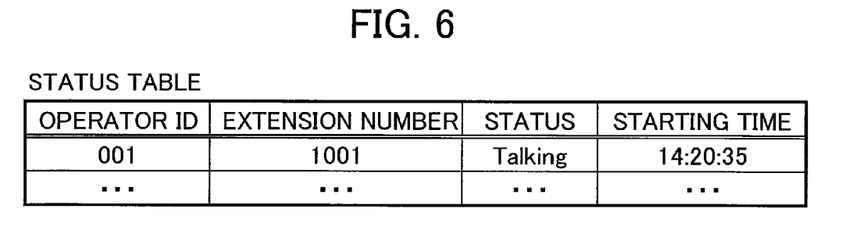
FIG. 6 is an illustration of a status table according to an exemplary embodiment of the present disclosure.

In the status table, an ID can be stored that identifies the operator, an extension number, the current status, and the time at which the current status occurred. For example, a receipt of the status can be performed at a prescribed period of, for example, each second or the like, and as a result, each record of the status table can be updated at the period. Moreover, it is possible for the period to be a sufficiently shorter interval than the threshold stored in the exemplary configuration table (see FIG. 5), and as a result, it is possible for the server 10 to determine that an elapsed time has exceeded a threshold value without delay.

In Step S115, the server 10 can receive a response rate per campaign from the telephone switchboard 30. At the telephone switchboard 30, the telephones 40 can be sorted beforehand into prescribed groups (e.g., corresponding to campaigns) and supervised, and a response rate per group can be evaluated.

In Step S120, the server 10 can determine whether or not the received status is identical to a status (immediately preceding) stored in a status table. In a case in which it is determined to be identical thereto (there is no change in status), the process can be transitioned to Step S125, and in a case of being determined to be different (there is a change in status), the process can be transitioned to Step S140.

In Step S125, the server 10 can determine an elapsed time since entering the current status. For example, a calculation thereof can be performed by a difference between the current time and a starting time stored in the status table. Further, the exemplary calculation/determination method of elapsed time is not limited thereto. For example, when the starting time field of the status table is replaced with the elapsed time field, receipt of status of Step S110 can be performed at a prescribed period, and each time, it is possible to achieve thereof by updating the elapsed time field.

In Step S130, the server 10 can determine whether or not the calculated elapsed time has exceeded a threshold value corresponding to a current status stored in the status table. In a case in which the threshold value has been exceeded, a warning flag indicating that a threshold value of an elapsed time has been exceeded can be turned ON (see Step S135). In a case of the elapsed time not having been exceeded, the warning flag can be turned OFF (Step S150).

In Step S140, the server 10 can update the status table with the received current status, and update the starting time of the status with the current time (Step S145). As a result, the elapsed time can return to 0, and therefore the server 10 can turn the warning flag OFF (Step S150).

In Step S155, the terminal 20 can display a status and elapsed time of each operator according to the display example as shown in FIG. 3. At that time, the server 10 can generate display data according to data in the configuration table, e.g., based on the status and elapsed time of each operator stored in the status table. The terminal 20 can update a display of the screen by receiving this display data from the server 10.

For example, in a case in which a warning flag has been set to ON in Step S135, the elapsed time of the current status has exceeded the threshold value, and therefore a display aspect of the elapsed time is changed in order to be more easily visually identified compared to a case in which the warning flag is OFF. More specifically, a style of text, for example (font, size, color and the like), or a display rendition (such as blinking or an ornamental image of a warning lamp and the like) thereof can be changed.

Figure 7:
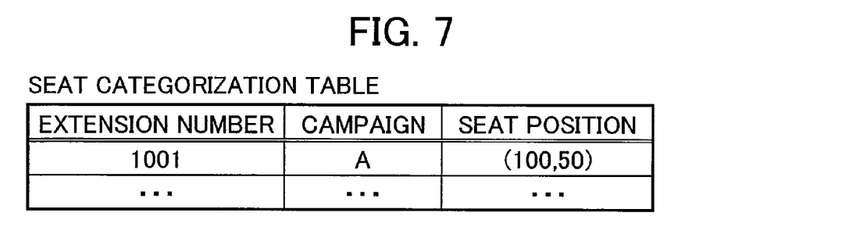
FIG. 7 is an illustration of a seat categorization table according to an exemplary embodiment of the present disclosure.

Moreover, the assigned color for each campaign and display position for a seat illustrated in FIG. 3 can be stored beforehand in, for example, the seat categorization table shown in FIG. 7. In the seat categorization table, an extension number identifying a seat, a campaign (task, organization), and a seating position (the coordinates) can be stored. As a result, it is possible for the server 10 to read out a display position of the seat image 24 and an assigned color (associated with a campaign and stored), and display thereof on the terminal 20.

In Step S160, the server 10, based on statuses of operators included in each campaign, can determine a standby level (e.g., a latitude level). For example, a number, ratio, or the like of the status "ready" can represent thereof, and a possibility of maintaining a response rate even in a case of increasing a quantity of calls over the present can thereby be indicated.

In Step S165, the terminal 20 can display a response rate received in Step S115 and a standby level determined/calculated in Step S160. The display indicating the standby level can display, for example, an image indicating that there is no latitude in a case of falling below a prescribed threshold value. Alternatively, the standby level can be displayed as a number, but in a case of falling below a prescribed threshold value (there being no latitude), it is desirable for a display aspect thereof to be changed so as to attraction the attention of the user thereto.

In Step S170, the server 10 can determine whether or not to finish processing. For example, the processing is stopped in response to receiving data of an instruction to finish processing from a user, and in a case of not finishing, the processing can return to Step S105, and the exemplary monitoring of the status can continue (by returning to Step S105).

The exemplary processing described herein can be performed by reading out the programs stored in each of the storage units 120 of the server 10 and the terminal 20, and each of the controllers 110 executing thereof. For example, the program executed in the terminal 20 can be stored beforehand in the storage unit/arrangement 120 of the terminal 20 and, for example, can be configured so as to be received from the server 10, by having the terminal 20 access the server 10 by conventional Web application technology or the like.

As a result, since the dedicated program related to the exemplary embodiments of the present disclosure can be stored in the server 10, the terminal 20 can be a general-use computer terminal including a Web browser and the like. Therefore, it is possible to perform replacement and the like of the terminal 20 easily.

As above, although an embodiment of the present disclosure has been described, the present disclosure is not limited to the above-described exemplary embodiment. Furthermore, the effects described in the exemplary embodiment of the present disclosure have only been recited as the most preferable effects generated by the present disclosure, and the effects of the present disclosure are not limited to those described in the exemplary embodiment of the present disclosure.

Indeed, the foregoing merely illustrates the exemplary principles of the exemplary embodiments of the present disclosure. Various modifications and alterations to the described embodiments will be apparent to those skilled in the art in view of the teachings herein. It will thus be appreciated that those skilled in the art will be able to devise numerous modification to the exemplary embodiments of the present disclosure which, although not explicitly shown or described herein, embody the principles of the exemplary embodiments of the present disclosure and are thus within the spirit and scope of such exemplary embodiments. All publications, applications and patents cited above are incorporated herein by reference in their entireties.

The invention claimed is:

1. A server arrangement connected, via a communication arrangement, to a telephone switchboard and a terminal which includes a display arrangement, and which is configured to monitor a state of an operator in a contact center, the server arrangement comprising:
    a first arrangement configured to receive data corresponding to an operational status indicating an operational status of a telephone terminal used by the operator from the telephone switchboard;
    a second arrangement configured to measure an elapsed time after a change of the operational status;
    a third arrangement configured to read out configuration data associated and previously stored according to the received operational status data; and
    a fourth arrangement configured to generate display data for displaying an image indicating the operational status and the elapsed time at a predetermined position on the display arrangement corresponding to a seating position of the operator, and transmit the display data to the terminal based on the configuration data and the elapsed time.

2. The server arrangement according to claim 1, further comprising a fifth arrangement configured to associate display color data of the image with data corresponding to the operational status, and store the display color data, as at least one portion of the configuration data, wherein the image is color-coded by the display color data according to the operational status.

3. The server arrangement according to claim 2, further comprising a sixth arrangement configured to receive the display color data from the terminal.

4. The server arrangement according to claim 1, further comprising a seventh arrangement configured to associate a threshold value for the elapsed time with the operational status data and store the threshold value, as at least one portion of the configuration data, wherein, when the elapsed time exceeds the threshold value, the server arrangement changes a display aspect of the elapsed time in the image.

5. The server arrangement according to claim 4, further comprising an eighth arrangement configured to receive the threshold value from the terminal.

6. The server arrangement according to claim 1, wherein the display data includes data identifying the operator and an extension number.

7. The server arrangement according to claim 1, further comprising a ninth arrangement configured to receive identification data of a recording device recording a conversation of the operator from the telephone switchboard, wherein the display data includes the received identification data.

8. The server arrangement according to claim 1, further comprising:
- a tenth arrangement configured to associate particular categorization data that is categorized into each task for which the telephone terminal is used and categorization color data for distinguishing the display thereof with further data previously identifying the telephone terminal, and the tenth arrangement stores at least one of the particular categorization data, the categorization color data or the further data;
- an eleventh arrangement configured to receive a response rate for each of the tasks evaluated by the telephone switchboard, and
- a twelfth arrangement configured to transmit the response rate for each of the tasks received to the terminal in order to be displayed on the display arrangement, wherein the display data includes the categorization color data.

9. The server arrangement according to claim 8, further comprising:
- a thirteenth arrangement configured to obtain a standby level for the operator for each of the tasks, based on the operational status; and
- a fourteenth arrangement configured to transmit to the terminal an image indicating the standby level in order to display the image to be linked to the response rate.

10. A system that monitors a state of an operator in a contact center, which comprises:
- at least a server arrangement comprising:
    - a first arrangement configured to receive data corresponding to an operational status indicating an operational status of a telephone terminal used by the operator from a telephone switchboard connected to the server arrangement,
    - a second arrangement configured to measure an elapsed time after a change of the operational status,
    - a third arrangement configured to read out configuration data associated and previously stored according to the received operational status data, and
    - a fourth arrangement configured to generate display data for displaying an image indicating the operational status and the elapsed time based on the configuration data and the elapsed time; and
- a terminal connected to the server arrangement via a communication arrangement, the terminal comprising a fifth arrangement configured to display the image at a predetermined position on a display arrangement of the terminal corresponding to a seating position of the operator, based on the display data received from the server arrangement.

11. The system according to claim 10, wherein the server arrangement further comprises a sixth arrangement configured to associate display color data of the image with data corresponding to the operational status and store the display color data as at least one portion of the configuration data; and wherein the image is color-coded by the display color data according to the operational status.

12. The system according to claim 11, wherein the terminal further comprises a seventh arrangement configured to accept an input of the display color data from a user and transmit the display color data to the server arrangement.

13. The system according to claim 10, wherein the server arrangement further comprises an eighth arrangement configured to associate a threshold value for the elapsed time with the operational status data and store the threshold value as at least one portion of the configuration data, and wherein, when the elapsed time exceeds the threshold value, the server arrangement changes a display aspect of the elapsed time in the image.

14. The system according to claim 13, wherein the terminal further comprises a ninth arrangement configured to accept input of the threshold value from a user and transmit the threshold value to the server arrangement.

15. The system according to claim 10, wherein the display data includes data identifying the operator and an extension number.

16. The system according to claim 10, wherein the server further comprises a tenth arrangement configured to receive identification data of a recording device recording a conversation of the operator from the telephone switchboard, and wherein the display data includes the received identification data.

17. The system according to claim 10,
wherein the server further comprises:
- an eleventh arrangement configured to associate particular categorization data that is categorized into each task for which the telephone terminal is used, and categorization color data for distinguishing the display thereof, with further data previously identifying the telephone terminal, and to store at least one of the particular categorization data, the categorization color data or the further data, and
- a twelfth arrangement configured to receive a response rate for each of the tasks evaluated by the telephone switchboard, and
the terminal further comprises a thirteenth arrangement configured to display the response rate for each of the tasks received from the server arrangement on the display arrangement, wherein the display data includes the categorization color data.

18. The system according to claim 17, wherein the server arrangement further comprises a fourteenth arrangement configured to obtain a standby level for the operator for each of the tasks based on the operational status, and wherein the terminal further comprises a fifteenth arrangement configured to link an image indicating the standby level received from the server arrangement to the response rate and display the image.

19. Non-transitory computer-accessible medium which includes a computer program thereon for monitoring a state of an operator in a contact center in a system which includes at least a server arrangement and a terminal connected via a communication arrangement, wherein, when executed by the server arrangement, the program configures the server arrangement to perform procedures comprising:
- receiving data corresponding to an operational status indicating an operational status of a telephone terminal used by the operator from the telephone switchboard,
- measuring an elapsed time after a change of the operational status,
- reading out configuration data associated and previously stored according to the received operational status data;
- generating display data for displaying an image indicating the operational status and the elapsed time based on the configuration data and the elapsed time; and
- facilitating the terminal to display the image at a predetermined position on a display arrangement of the terminal corresponding to a seating position of the operator based on the display data received from the server arrangement.

* * * * *